United States Patent
Tang et al.

(10) Patent No.: US 10,567,407 B2
(45) Date of Patent: Feb. 18, 2020

(54) METHOD AND SYSTEM FOR DETECTING MALICIOUS WEB ADDRESSES

(71) Applicant: iYuntian Co., Ltd., Beijing (CN)

(72) Inventors: Chengguang Tang, Beijing (CN); Nian Yang, Beijing (CN); Zhifeng Geng, Beijing (CN)

(73) Assignee: IYUNTIAN CO., LTD., Beijing (CN)

( * ) Notice: Subject to any disclaimer, the term of this patent is extended or adjusted under 35 U.S.C. 154(b) by 26 days.

(21) Appl. No.: 15/504,276

(22) PCT Filed: Sep. 25, 2015

(86) PCT No.: PCT/CN2015/090648
§ 371 (c)(1),
(2) Date: Feb. 15, 2017

(87) PCT Pub. No.: WO2016/173200
PCT Pub. Date: Nov. 3, 2016

(65) Prior Publication Data
US 2018/0041530 A1    Feb. 8, 2018

(30) Foreign Application Priority Data

Apr. 30, 2015 (CN) .......................... 2015 1 0219801

(51) Int. Cl.
*H04L 29/06* (2006.01)
*G06F 16/951* (2019.01)
*H04L 29/08* (2006.01)

(52) U.S. Cl.
CPC ........ *H04L 63/1425* (2013.01); *G06F 16/951* (2019.01); *H04L 63/1433* (2013.01); *H04L 67/02* (2013.01); *H04L 67/18* (2013.01)

(58) Field of Classification Search
CPC ... E04H 4/06; H04L 63/1425; H04L 63/1433; H04L 67/02; H04L 67/18; H04L 63/107;
(Continued)

(56) References Cited

U.S. PATENT DOCUMENTS 6,553,310 B1 * 4/2003 Lopke ................... H04L 67/16
   701/454
8,707,441 B1 * 4/2014 Cidambi ............... H04L 63/145
   726/25

(Continued)

FOREIGN PATENT DOCUMENTS

CN    103634317 A    3/2014
CN    103701779 A    4/2014
(Continued)

OTHER PUBLICATIONS

PCTCN2015090648, English Translation of the International Search Report dated Feb. 21, 2016, 2 pages.

*Primary Examiner* — Maung T Lwin
*Assistant Examiner* — Suman Debnath
(74) *Attorney, Agent, or Firm* — Lathrop GPM LLP

(57) ABSTRACT

The present application provides a method and system for detecting malicious web addresses. The method includes: receiving a uniform resource locator (URL) reported by a user; acquiring a HyperText Transfer Protocol (HTTP) request chain associated with the URL, wherein the HTTP request chain is a sequential linked list including information about multiple HTTP request-response interactions during an access to the URL; and analyzing the HTTP request chain to determine whether the URL is a malicious web address. The technical solution of the present application can provide an accurate result of malicious web address detection, can detect various newly emerging malicious web addresses, and are user-friendly. The user only needs to upload the URL and does not need to provide any other information.

18 Claims, 9 Drawing Sheets

(58) Field of Classification Search
CPC ............... H04L 63/1483; G06F 16/951; G06F 2221/2101; G06F 2221/2103
See application file for complete search history.

(56) References Cited

U.S. PATENT DOCUMENTS

| | | | | |
|---|---|---|---|---|
| 9,531,736 | B1* | 12/2016 | Torres | H04L 63/1408 |
| 2007/0288696 | A1* | 12/2007 | Repasi | G06F 21/51 |
| | | | | 711/135 |
| 2008/0133540 | A1* | 6/2008 | Hubbard | H04L 63/101 |
| 2014/0317738 | A1* | 10/2014 | Be'ery | H04L 63/14 |
| | | | | 726/23 |
| 2015/0200962 | A1* | 7/2015 | Xu | G06F 21/562 |
| | | | | 726/23 |

FOREIGN PATENT DOCUMENTS

| | | | |
|---|---|---|---|
| CN | 103870329 | A | 6/2014 |
| CN | 103902889 | A | 7/2014 |
| CN | 104021343 | A | 9/2014 |
| CN | 104766014 | A | 7/2015 |

\* cited by examiner

METHOD AND SYSTEM FOR DETECTING MALICIOUS WEB ADDRESSES

CROSS-REFERENCE TO RELATED APPLICATION

This application is related to and claims priority from Chinese application No. 201510219801.1, filed on Apr. 30, 2015, entitled "Method And System For Detecting Malicious Web Addresses," the entire disclosure of which is hereby incorporated by reference.

TECHNICAL FIELD

The present application generally relates to the field of computer technology, particularly to the field of network information security, and more particularly to a method and system for detecting malicious web addresses.

BACKGROUND

When network users browse web pages on the Internet, some malicious websites such as phishing websites, Trojan-planted websites, and fraudulent websites threaten their information security.

At present, methods for detecting malicious web page based on web page text contents are capable of achieving satisfactory results. However, to bypass detection engines of security-software vendors, hackers no longer design malicious websites that include many web page text contents, but process malicious web pages by using encryption algorithms and web page virtualization technology, and add dependent web page jumps. Specifically, a dependent web page jump is characterized in that in a complete web page request, a downstream web page depends on related information of an upstream web page, for example, refer, cookie. Consequently, the web page results obtained by the detection engines lack the text content characteristic, resulting in a sharp decrease in the detection capability.

In the prior art, web page contents are generally retrieved by using static crawlers. The principle of static crawlers is similar to that of Wget. The name Wget derives from "World Wide Web" and "get". It is a free tool for automatically downloading files from a network, supports downloading via the three most common Transmission Control Protocol/Internet Protocol (TCP/IP) protocols, namely, HyperText Transfer Protocol (HTTP), Hypertext Transfer Protocol Secure (HTTPS), and File Transfer Protocol (FTP), and may use HTTP proxies.

Wget downloads web page contents including Hypertext Markup Language (HTML), Cascading Style Sheet (CSS), JavaScript, and Flash files for analysis by a detection engine. The detection engine has to rely on certain fixed components in web pages in order to protect against malicious web pages. However, learning of these fixed components requires manual summarization and relies on prior knowledge and is both time- and labor-consuming. The detection effectiveness is also not satisfactory.

Some security-software vendors having strong research and development abilities have tried the use of active crawlers. An open-source browser kernel (a layout engine such as webkit or gecko) is wrapped so that a crawler can render a web page. The content after web page rendering is then exported for analysis by the detection engine.

However, the above-mentioned detection solutions cannot address newly emerged malicious websites.

SUMMARY

In view of the above-mentioned defects or deficiencies of the prior art, it is expected to provide a solution that can effectively improve the capability of detecting malicious web addresses.

According to a first aspect, an embodiment of the present application provides a method for detecting malicious web addresses, comprising: receiving a uniform resource locator (URL) reported by a user; acquiring a HyperText Transfer Protocol (HTTP) request chain associated with the URL, wherein the HTTP request chain is a sequential linked list comprising information about multiple HTTP request-response interactions during the access to the URL; and analyzing the HTTP request chain to determine whether the URL is a malicious web address.

According to a second aspect, an embodiment of the present application also provides a system for detecting malicious web addresses, the system comprising a crawler subsystem and a detection subsystem. The crawler subsystem comprises a crawler scheduling server and one or more active crawler servers. The crawler scheduling server is configured to receive a uniform resource locator (URL) reported by a user, and schedule the active crawler servers. The active crawler server is configured to acquire, as scheduled by the crawler scheduling server, a HyperText Transfer Protocol (HTTP) request chain associated with the URL, wherein the HTTP request chain is a sequential linked list comprising information about multiple HTTP request-response interactions during an access to the URL. The detection subsystem comprises an analysis unit configured to analyze the HTTP request chain to determine whether the URL is a malicious web address.

The solution for detecting malicious web addresses that is provided in the embodiments of the present application, by acquiring an HTTP request chain associated with a URL, can obtain a comprehensive web page content associated with the URL, and thus can perform accurate detection on malicious web addresses. The technical solution of the present application can provide an accurate result of malicious web address detection, can detect various newly emerging malicious web addresses, and are user friendly. The user only needs to upload the URL and does not need to provide any other information.

BRIEF DESCRIPTION OF THE DRAWINGS

Other features, purposes and advantages of the present application will become more apparent from a reading of the detailed description of the non-limiting embodiments, said description being given in relation to the accompanying drawings, among which:

FIG. 11, FIG. 12, and FIG. 13 each shows a part of HTTP request chain information when accessing the above-mentioned malicious web address that is a fake QQ login web page;

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
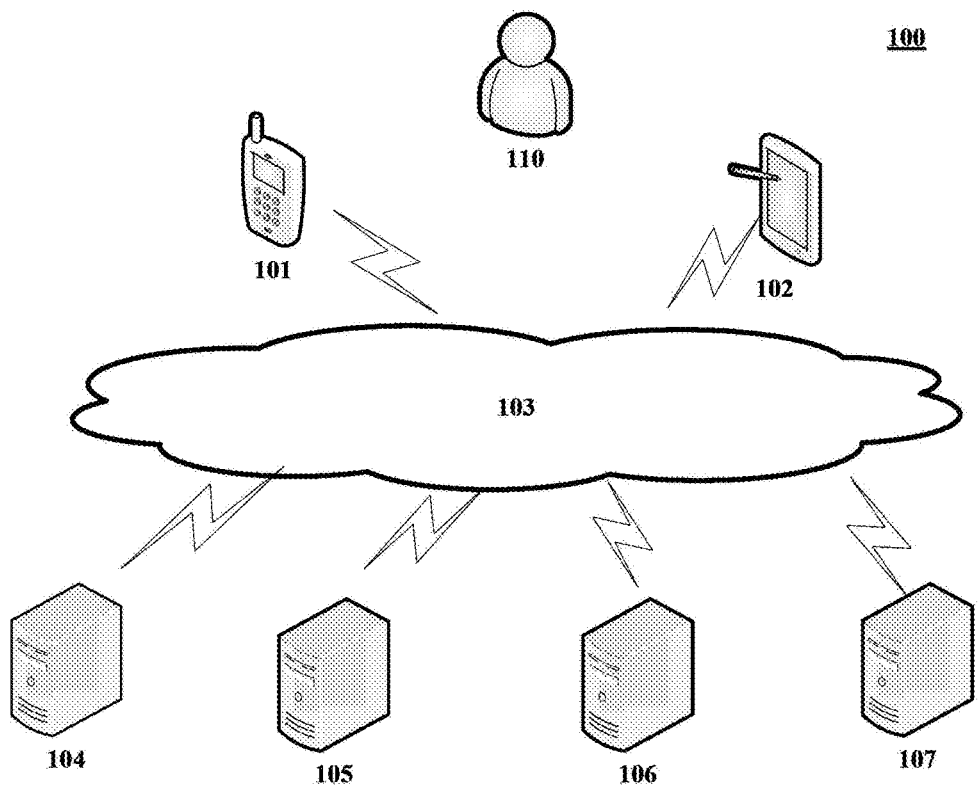
FIG. 1 shows an exemplary system architecture to which embodiments of the present application can be applied.

Referring to FIG. 1, FIG. 1 shows an exemplary system architecture 100 to which embodiments of the present application can be applied.

As shown in FIG. 1, the system architecture 100 may include terminal devices 101 and 102, a network 103, and servers 104, 105, 106, and 107. The network 103 is a medium for providing communication links between the terminal devices 101 and 102 and the servers 104, 105, 106, and 107. The network 103 may include various connection types, such as wired and wireless communication links or optical fiber cables.

A user 110 may use the terminal devices 101 and 102 to interact with the servers 104, 105, 106, and 107 through the network 103 to access various services, for example, browse a web page, download data, and so on. Various client applications, for example, applications that can connect to a uniform resource locator (URL) cloud service, including, but not limited to, browsers and security applications, may be installed on the terminal devices 101 and 102.

The terminal devices 101 and 102 may be any electronic devices, including, but not limited to, a personal computer, a smart phone, a smart television, a tablet computer, a personal digital assistant, an e-book reader.

The servers 104, 105, 106, and 107 may be servers providing various services. A server can provide a service in response to a service request from a user. It should be appreciated that one server may provide one or more services, and one service may be provided by multiple servers. The server involved in the embodiments of the present application may include, but not limited to, a crawler scheduling server, an active crawler server, a web page server, a detection server, an image recognition server, a semantic parsing server, and the like.

It should be appreciated that the numbers of the terminal devices, the networks and the servers in FIG. 1 are merely illustrative. Any number of terminal devices, networks and servers may be provided based on the actual requirements.

As mentioned in the Background section, in the prior art, web page contents are generally grabbed by using static crawlers. However, because the static crawler solution considers each URL in isolation and does not consider a complete HTTP request session process, context information is lost, and the final web page rendering result cannot be acquired, leading to inconsistency between the web page content acquired by the detection engine and the web page content observed by an ordinary user, and further resulting in an inaccurate detection result. Moreover, it is difficult to find rules of characteristics in the web page, and even if some can be found, there is a high false alarm rate of detection.

On the other hand, the active crawler solution cares only about the final result of the web page and ignores the intermediate process. Because the active crawler solution cares about the web page content itself, that is, the body of the web page and ignores external description information such as the header, web page description information is lost. Furthermore, even if some header information is used, classification is performed only by manually setting a judgment rule set (for example, if-else statement), which is time- and labor-consuming and inaccurate.

In view of the above-mentioned defects of the prior art, the embodiments of the present application provide a solution for detecting malicious web addresses based on an HTTP request chain. The HTTP request chain is a sequential linked list including information about multiple HTTP request-response interactions during an access to the URL. By acquiring complete HTTP request chain information of a web page, abundant information including context information can be obtained, so that it can be effectively checked whether a URL to be detected is a malicious web address. The method of the embodiments of the present application is described below in conjunction with flow charts.

Figure 2:
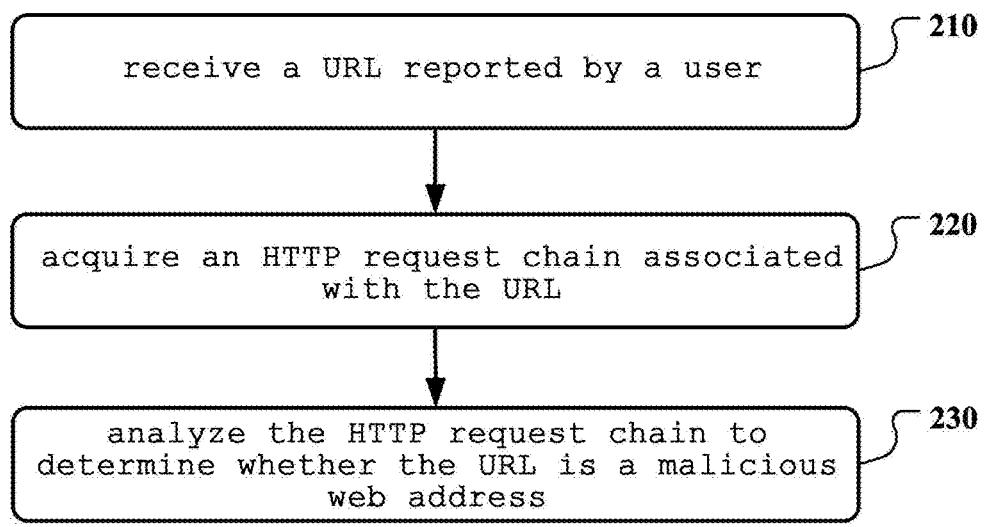
FIG. 2 is an exemplary flow chart of a method for detecting malicious web addresses according to an embodiment of the present application.

Referring to FIG. 2, FIG. 2 is an exemplary flow chart of a method for detecting malicious web addresses according to an embodiment of the present application. The method shown in FIG. 2 may be executed on the server side in FIG. 1.

As shown in FIG. 2, in step 210, a uniform resource locator (URL) reported by a user is received.

When accessing web pages by using an application such as a browser, the user may find some suspicious URLs. The user may report the suspicious URLs to a server for detection, to distinguish whether they are malicious web addresses. The user may report the suspicious URLs by using an application installed on a terminal device. The application may be an application that can connect to a URL cloud service, for example, including, but not limited to, a browser, an antivirus applications, a security guard.

Next, in step 220, an HTTP request chain associated with the reported URL is acquired, wherein the HTTP request chain is a sequential linked list comprising information about multiple HTTP request-response interactions during an access to the URL.

Generally all existing web pages include multiple pictures, Cascading Style Sheet (CSS) external file links, Flash files, JavaScript external script links, and so on. Therefore, when accessing a web page, multiple HTTP requests need to be initiated to request a server for these files. The server returns a response to each request. These request-response interactions are chronologically arranged into a sequential linked list, which is referred to as an HTTP request-response chain herein, and briefly referred to as an HTTP request chain. Therefore, in short, the HTTP request chain is a sequential linked list, is a browsing session, and is a complete representation of multiple HTTP request-response interactions during an access to a web page.

When a client (for example, a browser) sends a request to a Web server, it transfers a data block, that is a request packet, to the Web server. In response to the request, the Web server returns a data block, that is, a response packet, to the client. The HTTP request packet and the HTTP response packet include various information related to the access of the web page, such as external description information, context information, a web page content, and so on. Therefore, by acquiring the HTTP request packet and the HTTP response packet, information useful for detecting malicious websites can be obtained therefrom.

The HTTP request packet and the HTTP response packet both include three parts: start line, header, and entity-body. The difference between the request packet and the response packet lies only in the start line. In the HTTP protocol, different contents are specified for the parts of the request packet and the response packet.

For example, the start line of the request packet (or referred to as a request line) includes a method and a request URL (request-URL). The method describes an operation that the server should execute, and the request URL describes a resource on which the method is to be executed. The request line further includes a version of the HTTP protocol, for informing the server of the HTTP version used by the client. For example, the method in the request packet may include: GET (acquire a document from the server), HEAD (acquire only the header of a document from the server), POST (send to-be-processed data to the server), PUT (store the body part of the request to the server), TRACE (trace a packet that may be transmitted to the server via a proxy server), OPTIONS (determine which methods can be executed on the server), and DELETE (delete a document from the server).

The start line of the response packet (or referred to as a status line) also includes a version of the HTTP protocol. The start line of the response packet further includes a status code (status) and a reason-phrase (reason-phrase). The status code is in the form of three digits, and describes what occurs during the request process. The first digit of each status code is used for describing the general category of the status ("successful", "failed", etc.). For example, commonly used status codes include: 1xx, informational status code, for example, 100, 101; 2xx, success status code, for example, 200 OK; 3xx, redirection status code, for example, 301 Moved Permanently, 302 Found; 4xx, client error status code, for example, 404 Not Found, indicating that the requested URL resource does not exist; 5xx, server error status code, for example, 500 Internal Server Error. The reason-phrase is a readable version of the digital status code, that is, is a brief text description of the digital status code. The reason-phrase is merely for illustrating the status code, and the client still uses the status code to determine whether the request/response is successful.

The header adds some additional information to the request packet and the response packet. Such additional information appears in the form of values of user agent-host pairs. There may be zero or multiple headers.

The entity-body is the payload of an HTTP packet, that is, the content to be transmitted by the HTTP. The entity-body includes a data block consisting of any data, and can carry many types of digital data, for example, pictures, videos, HTML document, software applications, credit card transactions, emails, etc. Not all the packets include the entity-body part. For example, a GET request does not include the entity-body.

The above briefly describes the HTTP request packet and the response packet. Those skilled in the art may refer to the HTTP protocol for detailed information about the HTTP packets, and the details will not be repeatedly described here.

Figures 3, 4:
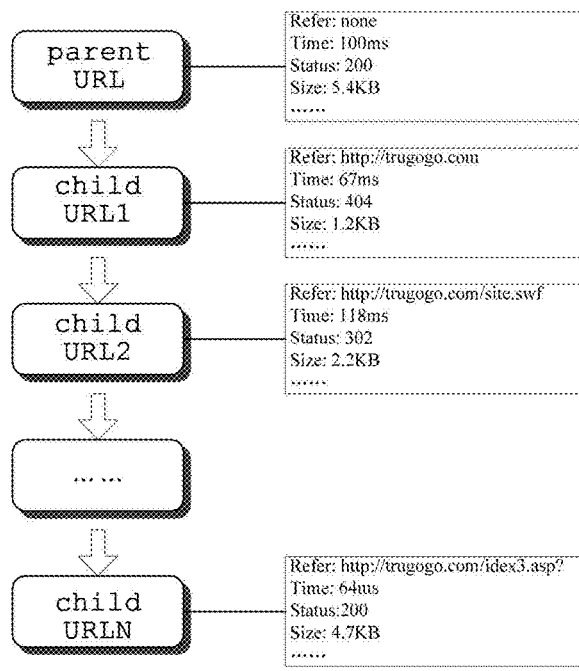
FIG. 3 is an exemplary screenshot of an HTTP request chain.
FIG. 4 shows an exemplary abstract representation of an HTTP request chain.

FIG. 3 is an exemplary screenshot of an HTTP request chain. As shown in FIG. 3, when accessing a web page www.trugogo.com, a client sends multiple HTTP requests to a server. These requests may be chronologically arranged into an HTTP request chain. During the access of the above-mentioned web page, a total of 89 requests are sent. The screenshot of FIG. 3 shows only the first several requests. The screenshot records related information of each request-response interaction, for example, including, status, method, file or path name, domain name, type, size, and wait time. In addition, the HTTP request packet and the response packet of each request-response interaction can also be viewed.

The above-mentioned HTTP request chain in FIG. 3 may be abstracted to express more vividly the relationship between URLs. FIG. 4 shows an exemplary abstract representation of an HTTP request chain.

As shown in FIG. 4, the URLs are arranged according to a parent-child relationship. Detailed information of each URL is listed in a block nearby, and includes such information as reference, time, status, and size.

Referring to FIG. 2, after an HTTP request chain is acquired during an access of a web page, in step 230, the HTTP request chain is analyzed to determine whether the URL is a malicious web address.

As can be seen from the above, because the HTTP request chain includes abundant information, it can be determined whether the URL is a malicious web address based on the meanings conveyed by such information.

Generally, a malicious web address is poorly designed and does not have optimized code, and therefore usually has the problems of long loading time, incomplete page rendering, and incomplete loading of CSS. By digging out valuable characteristics from the HTTP request chain, the URL can be effectively detected. The acquisition and analysis of the HTTP request chain will be further described below in conjunction with flow charts.

Figure 5:
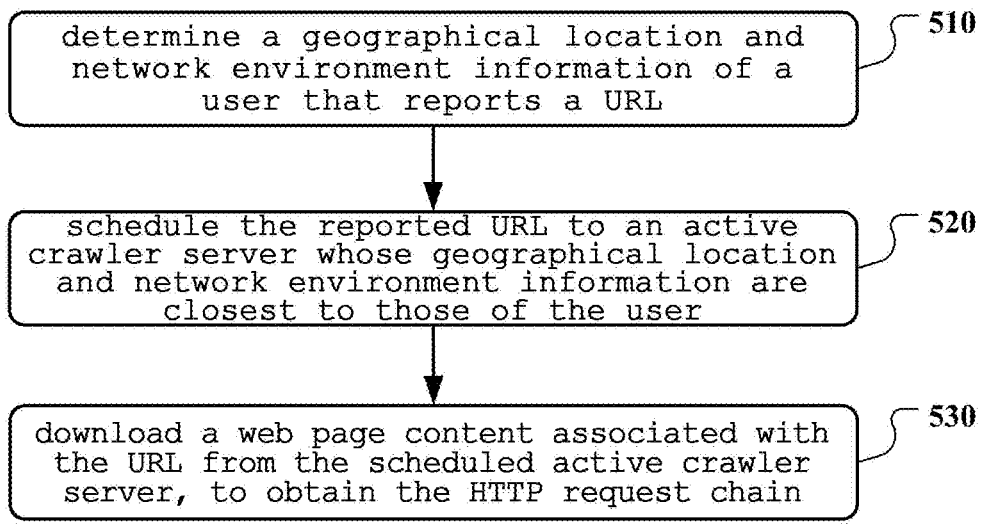
FIG. 5 is an exemplary flow chart of a method for acquiring an HTTP request chain according to an embodiment of the present application.

FIG. 5 is an exemplary flow chart of a method for acquiring an HTTP request chain according to an embodiment of the present application. In this embodiment, the HTTP request chain is acquired by using a distributed active crawler subsystem based on a user's geographical location. That is, the method shown in FIG. 5 may be executed by a distributed active crawler subsystem on the server side. The distributed active crawler subsystem includes a crawler scheduling server and one or more active crawler servers distributed in different geographical locations.

As shown in FIG. 5, in step 510, a geographical location and network environment information of a user that reports a URL are determined.

When the user uses a terminal device to access a URL cloud service, the crawler scheduling server may acquire an Internet Protocol (IP) address of a URL reported by the user. Based on the IP address, the crawler scheduling server may determine a geographical location (for example, country-province-city-community) and network operator information (for example, China Telecom or China Unicom) of the user. Further, the network environment information of the user may be determined based on the network operator information. The network environment information includes at least a network bandwidth.

Next, in step 520, the crawler scheduling server schedules the reported URL to an active crawler server whose geographical location and network environment information are closest to those of the user. For example, the crawler scheduling server may schedule the reported URL to an active crawler server that is nearest to the user and whose bandwidth environment is the same as (or closest to) that of the user, for downloading a web page content.

Some hackers may adopt a crawling blocking policy on the website. For example, the crawling of a crawler server is blocked by saving in advance information such as the IP address and the network egress of the crawler server. For example, the crawler server is redirected to another website, for example, a correct website. As a result, the web page content grabbed by the crawler server is not consistent with the web page content accessed by the user, leading to an inaccurate detection result. In this embodiment, by scheduling the URL to the active crawler server whose geographical location and network environment information are closest to those of the user in step 520, the real access environment of the user can be simulated on the server side as closely as possible, to ensure that the web page content downloaded by the crawler is as close as possible to the real web page content that the user sees, while increasing the success rate of web page downloading. In addition, the distributed crawler subsystem according to this embodiment of the present application include a huge number of active crawler servers and the locations and configuration of the active crawler servers may also be changed constantly. For example, an active crawler server may be removed or a new active crawler server may be added. Therefore, the active crawler servers are not easily blocked by malicious web addresses.

Then, in step 530, a web page content associated with the URL is downloaded from the scheduled active crawler server, to obtain the HTTP request chain.

As mentioned above, at present, many dependent web page jumps are added to malicious web address, and the acquired web page result lacks the text content characteristic due to such jumps. Therefore, in this embodiment, in addition to crawling the web page content according to the normal operation, the active crawler server further grabs a web page content after jumping and saves an intermediate result.

It is found through research that there are mainly the following three technologies that can be used to generate web page jumps on the browser side: HTML inline frame (iframe) tag, JavaScript, and Flash. Therefore, web page contents that jump with the three technologies may be grabbed by using corresponding methods respectively.

An iframe element in an HTML document creates an inline frame containing another document. In some implementations, an HTML Document Object Model (DOM) tree may be rendered by using a layout engine of a browser, to grab a web page content that jumps using an iframe tag in an HTML document. For example, the layout engine may include, but not limited to, webkit or gecko. In an implementation, the active crawler may render the HTML DOM tree by using an open-source webkit kernel, so that iframe can be loaded, to grab a web page content that jumps using iframe.

JavaScript is the most popular script language on the Internet. It can be inserted into an HTML page and can be executed by a browser after being inserted into the HTML page. JavaScript is used by millions of web pages for design improvement, form validation, browser detection, cookies creation, and more other applications. JavaScript may be used to change the content of an HTML page. For a web page content that jumps using the JavaScript technology, an open-source JavaScript engine (for example, Google's open-source V8 engine) may be used to execute JavaScript code, to grab the web page content that jumps using the JavaScript code.

Flash is a multimedia format. An SWF file used by a Flash player may be created by Adobe Flash, Adobe Flex, or other software or third-party tools. It uses bitmap and vector graphics at the same time, is programmed using an ActionScript script language, and supports bi-directional video streams and audio streams. Flash is suitable for developing and creating rich Internet applications and streaming video/audio. The Flash player uses the vector graphic technology to minimize the file size and create files that require a low network bandwidth and a short download time. Therefore, Flash has become a commonly used format for small games, animations, advertisements, and graphical user interfaces embedded in web pages. In some implementations of this embodiment of the present application, a Flash player plugin is compiled to enable the active crawler to have a Flash execution ability. Because the active crawler also has a session hold function, the active crawler can execute Flash to grab a web page content that jumps using Flash.

As can be seen from the above description, in some embodiments of the present application, in view of the problem of dependent web page jumps, using different crawling solutions for different jump technologies to grab web page contents after multiple jumps is proposed, and an intermediate result may also be saved. The purpose of this is to grab as many web page contents as possible, to obtain abundant page contents for subsequent analysis by the detection subsystem.

Figure 6:
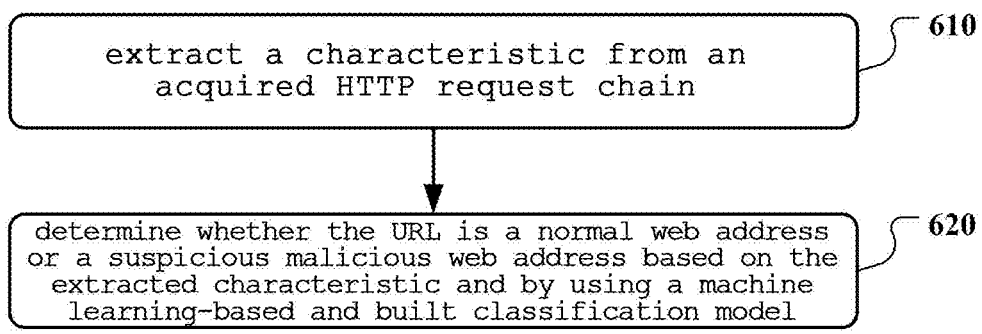
FIG. 6 is an exemplary flow chart of a method for analyzing an HTTP request chain according to an embodiment of the present application.

Referring to FIG. 6, FIG. 6 is an exemplary flow chart of a method for analyzing an HTTP request chain according to an embodiment of the present application. The method shown in FIG. 6 may be executed by a detection subsystem on the server side. As shown in FIG. 6, in step 610, a characteristic is extracted from an acquired HTTP request chain.

To dig out valuable characteristics from the HTTP request chain, differences between a malicious web address and a normal web address in various aspects may be obtained through comparison, to determine a characteristic to be extracted.

For malicious web addresses, hackers generally rent virtual hosts and do not adopt the content distribution network (CDN) technology, in order to reduce the costs.

The operating systems of virtual hosts are generally Windows Server. The Web Server generally adopts IIS. IIS (Internet Information Services) is a Microsoft Windows-based basic Internet service provided by Microsoft. IIS is a Web (web page) service component, and includes a Web server, an FTP server, an NNTP server, and an SMTP server, respectively for web page browsing, file transfer, news service, and email sending. It makes it easy to publish information on networks (including the Internet and local area networks). Programs run by the IIS Web Server are generally compiled using the ASP (Active Server Pages) language, because the ASP is a script language that is easy to learn. Many virtual host providers directly provide such integrated environments, and hackers can conveniently use them to cheat users by simply uploading malicious code.

In addition to IIS, some hackers may use Web servers such as netbox and kangle. Such servers are upgraded versions of IIS and has similar principles but more powerful functions. Large companies generally do not adopt such servers.

In addition, hackers usually rent virtual hosts abroad or in Hong Kong, because IP addresses abroad or in Hong Kong do not need to be put on records at the Ministry of Industry and Information Technology of China and many approval procedures are avoided.

Because servers are located abroad or in Hong Kong, there is a long delay when accessing the servers from China, and the delay is much longer than that when accessing a normal website. In addition, the access is not stable, and there is often child URLs with 404 error.

Moreover, hackers usually register a free subdomain name (usually ending with .tk, .pw etc.), because it is very convenient to register a free subdomain name. In contrast, applying for a regular domain name such as .com, .cn, and .org is troublesome, because materials need to be submitted for the record.

In terms of web page compilation, web pages written by hackers are usually complicated and have multiple dependent jumping behaviors. The purpose of this is to make it difficult for a web page crawler to acquire the final result of the web page. In addition, a downstream HTML page sub-request is often initiated in upstream JavaScript code. Moreover, hackers also like to encrypt web page contents.

Compared with malicious web addresses, webmasters or companies running large or medium-sized websites having normal web addresses usually have strong technical strength and financial support. Therefore, to ensure the user experience, many websites adopt the CDN technology. All HTML pages have been subjected to static processing, and no page content is generated in real time using a script language, so that the contents can be easily cached in a CDN.

For resources in a web page that need to be asynchronously loaded, backend interfaces are usually compiled using a language such as C, C++, or Java, because programs compiled using such programming languages have high performance. When the performance requirements are not high, Hypertext Preprocessor (PHP) may be adopted, but basically the ASP language will not be used to write code. Because once the ASP is used, matching facilities such as Windows Server and IIS need to be purchased, leading to limitations. Therefore, large and medium-sized companies generally do not use the ASP language.

Most regular websites use a Linux operating system, because most of Linux operating systems are open-source and free. The server IP of a regular website is basically in China, and a nginx or apache server is usually used as the Web server. The access delay is low, and the HTTP 404 Not Found error seldom occurs during resource loading. Regular websites generally do not have multiple jumping behaviors and do no encrypt web page contents. In addition, regular websites generally have been put on records at the Ministry of Industry and Information Technology of China.

As can be learned from the above analysis, the characteristic may be extracted from at least one of the following dimensions: upstream and downstream information, a server dimension, a web page programming language dimension, a time dimension, and web page description information.

More specifically, the upstream and downstream information may include at least one of the following information: the number of 302 jumps (for example, whether the number of 302 jumps exceeds a predetermined threshold of for example, 5), the percentage of 404 pages (for example, whether the percentage of 404 pages exceeds a predetermined percentage of for example, 50%), whether a child URL includes an advertising alliance link, whether a child URL includes a malicious sub-link, and whether a child URL includes a small website statistics tool.

The server dimension may include at least one of the following information: whether a server has a foreign Internet Protocol (IP) address, whether a server is Windows IIS, whether a content distribution network (CDN) technology is used, whether a server is a kangle server, whether a server is a netbox server, whether a server is a nginx server, whether a server is an apache server, and whether multimedia video is used.

The web page programming language dimension may include at least one of the following information: whether a web page is compiled using the Active Server Page ASP language, and whether a web page is compiled using the Hypertext Preprocessor (PHP) language.

The time dimension may include at least one of the following information: whether the time is a hot time (for example, May 1, October 1, November 11, Spring Festival, and so on), and whether the time is weekend. Generally, the amount of web browsing increases during the hot time and weekends. Therefore, malicious web addresses usually show up during such periods, increasing the probability of being visited.

The web page description information may include at least one of the following information: a web page size, a time for loading a single URL, whether a website has been put on records, whether a web page has been encrypted, and whether a web page has a free subdomain name.

Still referring to FIG. 6, after valuable characteristics are extracted, in step 620, it is determined whether the URL is a normal web address or a suspicious malicious web address based on the extracted characteristic and by using a machine learning-based and built classification model.

Machine learning is a method of finding a rule by automatically analyzing data and using the rule to predict unknown data. Machine learning of the classification model refers to adjusting the parameters of the classification model by using a set of samples of a given category, to enable to the classification model to reach the required performance.

Modeling and machine learning of the classification model may be performed by using multiple algorithms, for example, decision tree, linear discriminant analysis, nearest neighbor method, support vector machines, and so on. In some embodiments of the present application, the characteristic extracted in step 610 is modeled by using a Gradient Boosted Decision Tree (GBDT), to determine whether a URL is a normal web address (or referred to as gray) or a suspicious malicious web address (or referred to as suspicious black). The specific modeling process is known to those skilled in the art, and the detailed description of the process is omitted here.

As can be learned from the above description, in some embodiments of the present application, a judgment is made on the URL reported by the user by means of classification modeling based on the characteristic extracted from the HTTP request chain. Compared with the prior-art method of manually setting an if-else rule set for classification, the embodiments of the present application can greatly improve the detection efficiency and achieve high accuracy.

Figure 7:
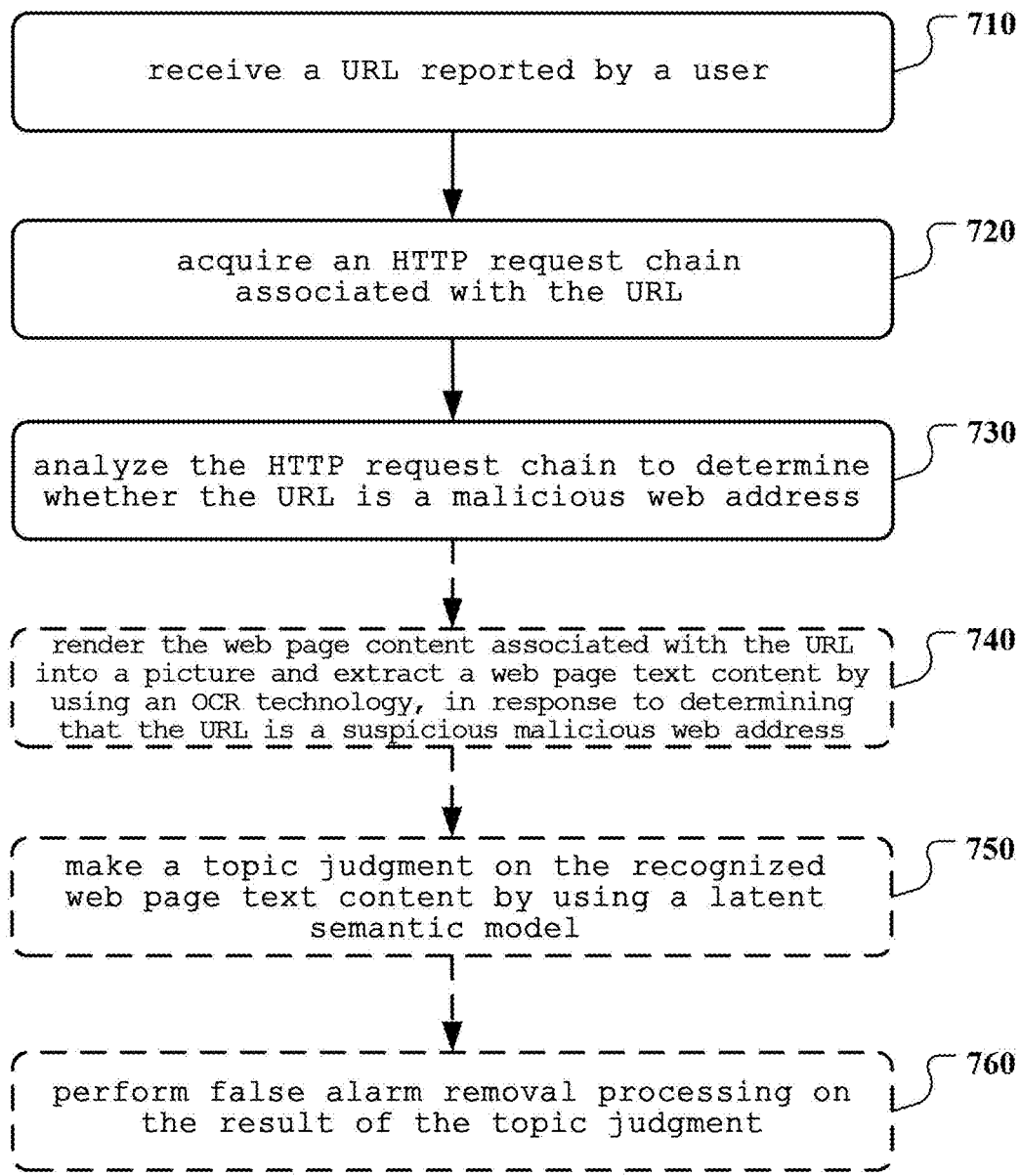
FIG. 7 is an exemplary flow chart of a method for detecting malicious web addresses according to another embodiment of the present application.

FIG. 7 is an exemplary flow chart of a method for detecting malicious web addresses according to another embodiment of the present application.

As shown in FIG. 7, steps 710 to 730 are the same as steps 210 to 230 in FIG. 2, and will not be repeatedly described here.

When the result of the analysis in step 730 indicates that the URL is a normal web address, the result may be returned to a client (not shown). If the result indicates that the URL is a suspicious malicious web address, optionally, in step 740, the web page content associated with the URL is rendered into a picture and a web page text content is extracted by using an optical character recognition (OCR) technology, in response to determining that the URL is a suspicious malicious web address. A network crawler has a function of rendering a web page content into a picture. A web page text content can be obtained by recognizing and extracting contents in the picture using an OCR technology. The OCR technology is known to those skilled in the art. In the present application, the web page content may be recognized by using any OCR technology that is known or will be developed in the future, and this is not limited in the present application.

Then, in step 750, a topic judgment is made on the recognized web page text content by using a latent semantic model.

A topic judgment may be made on the web page text content by using multiple topic models. In some embodiments, Latent Dirichlet allocation (LDA) may be used. The LDA is a topic model that presents a topic of each document in a document collection in the form of a probability distribution. Meanwhile, it is an unsupervised learning algorithm that does not require a manually annotated training set during training and only requires a document collection and a specified number of topics. In addition, another advantage of the LDA lies in that each topic can be described using some words. Currently, the LDA has been applied to the text mining field, including text topic recognition, text classification, and text similarity computing. In the present application, any topic judgment that is known or will be developed in the future may be used, and this is not limited in the present application.

Optionally or additionally, in step 760, false alarm removal processing is performed on the result of the topic judgment.

Because there is an error after the OCR conversion and the topic judgment, false alarm removal processing may further be performed on the result of the topic judgment. The false alarm removal processing may be performed by performing at least one of the following: determining, according to a white list, whether the determination of the URL as a malicious web address is a false alarm; determining, by querying access information related to the URL, whether the determination of the URL as a malicious web address is a false alarm; determining, by Internet content provider (ICP) filing information of the URL, whether the determination of the URL as a malicious web address is a false alarm; and determining, by querying qualification data related to the URL, whether the determination of the URL as a malicious web address is a false alarm.

The white list may store a name list of URLs that have been clearly determined to be non-malicious web addresses. Therefore, through comparison with the white list, it may be determined whether the determination of the URL as a malicious web address in the result of the topic judgment is a false alarm.

The access information related to the URL may include, but not limited to, the following information: the number of external links of the website, the number of child URLs under the domain name of the website, recent website search popularity index, and so on. Taking such access information into consideration can prevent some hot websites from being incorrectly reported as malicious web addresses. A corresponding threshold may be set for such access information. When the set threshold is exceeded, it may be considered to be a false alarm. The threshold may be set by experience.

Internet content provider (ICP) filing information can indicate whether a website is filed by an enterprise or by a public institution.

In addition, qualification data related to the URL, for example, medical qualification and ticket union data, may further be queried. If the website has the related qualification, it is considered to be a false alarm.

Compared with the embodiment of FIG. 2, in the embodiment of FIG. 7, when the judgment result based on the HTTP request chain indicates that the URL is a suspicious malicious web address, a further judgment is made by using the OCR technology and the topic judgment technology, to improve the detection accuracy. In addition, false alarm removal processing may be further performed, to reduce the false alarm rate of malicious web addresses. Because a preliminary judgment is made based on the HTTP request chain, suspicious web addresses for which the OCR and the topic judgment need to be used are greatly reduced, thereby improving the detection efficiency.

It should be noted that although the operations of the method of the present invention are described in a particular order in the accompanying drawings, it does not require or imply that these operations must be performed according to this particular order, or a desired outcome can only be achieved by performing all the operations shown. On the contrary, the execution sequences for the steps as depicted in the flow charts may change. Additionally or alternatively, some steps may be omitted, a plurality of steps may be merged into one step for execution, and/or a step may be divided into a plurality of steps for execution.

The method for detecting malicious web addresses according to the embodiments of the present application is described below with reference to a specific example.

Figure 8:
FIG. 8 is a web page screenshot of a malicious web address that is a fake QQ login web page.
Figure 9:
FIG. 9 is a web page screenshot of an official website.

FIG. 8 is a web page screenshot of a malicious web address that is a fake QQ login web page, whose URL address is http://aa.tenncentt.com/?JYDEMCEEQEEZJN HAEQWDFVTPZPTOQTMTBBTUGSWE=9191676219- 0584.html, and which is quite similar to the official page (http://aq.qq.com/). FIG. 9 is a web page screenshot of an official website.

Figure 10:
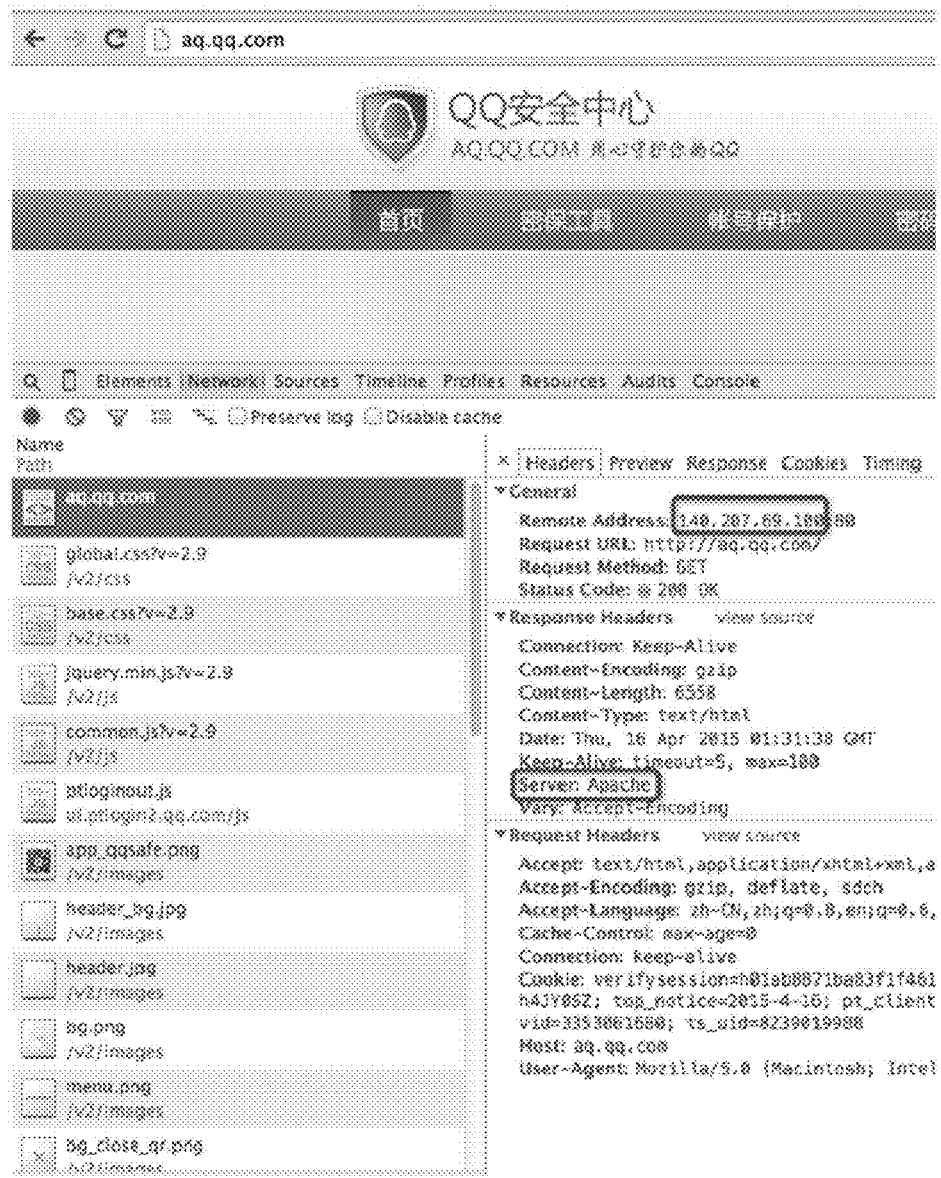
FIG. 10 shows HTTP request chain information when accessing an official website.

FIG. 10 shows HTTP request chain information when accessing an official website. By acquiring the HTTP request chain information when accessing the official page, it can be learned that the code of the official website of QQ is clearly written and can be loaded quickly (about 4 seconds), the IP address is 140.207.69.100 which is an IP address of China Unicom in Shanghai, and Apache is used as a Web server. In addition, the source code of the official website is not encrypted.

Figures 11, 12:
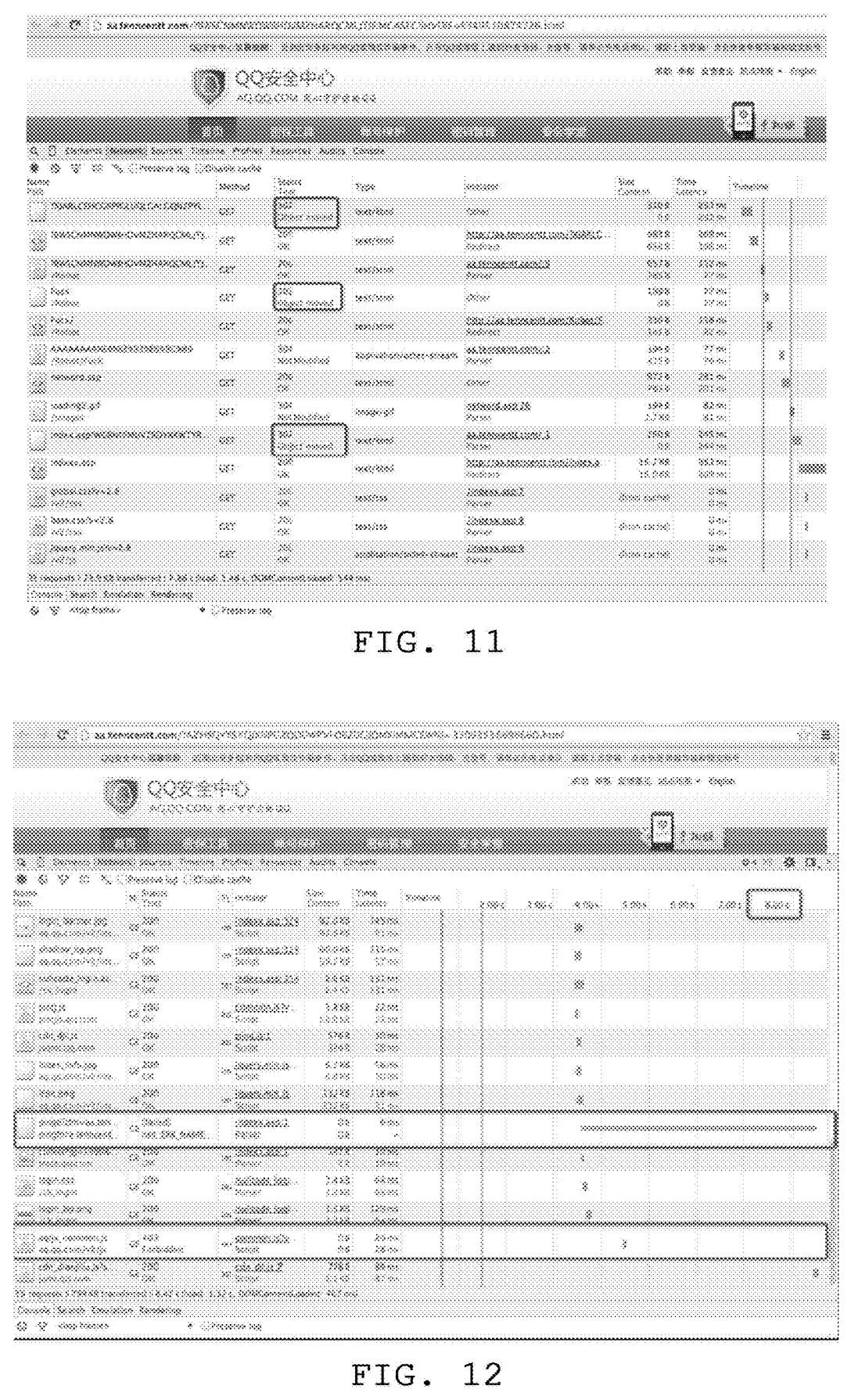
Figure 13:
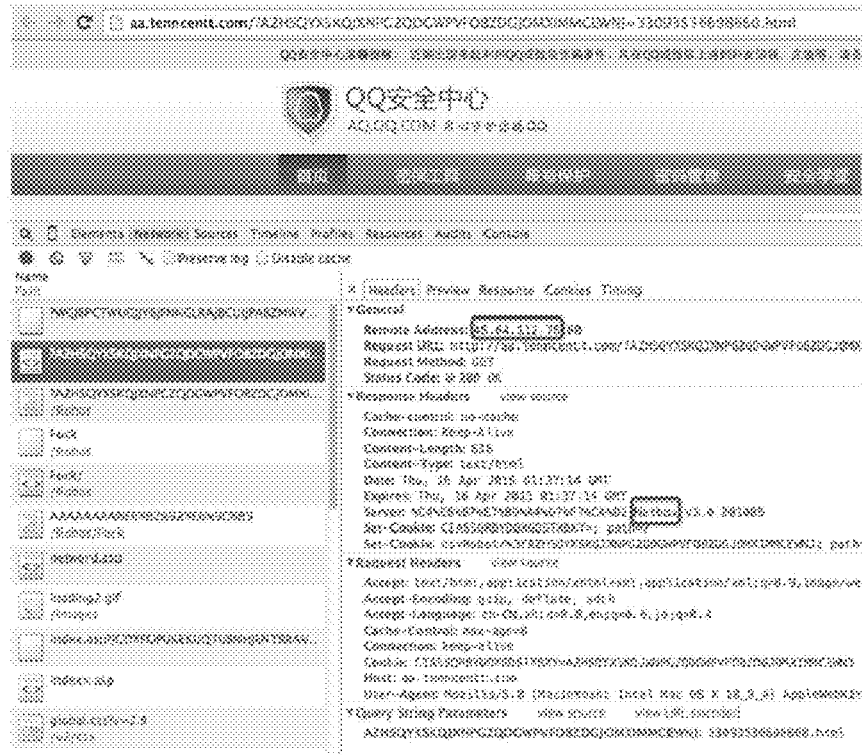

FIG. 11, FIG. 12, and FIG. 13 each shows a part of HTTP request chain information when accessing the above-mentioned malicious web address that is a fake QQ login web page. As can be seen from FIG. 11, the malicious web address has many 302 jumps. As can be seen from FIG. 12, the web page loading of the malicious web address may fail, for example, 403 Forbidden and failed, and there is a long load delay (for example, 8 seconds). As can be seen from FIG. 13, the IP address of the malicious web address is 45.64.112.76 from the United States, and NetBox is used as the Web server. In addition, the source code of the malicious web address is short and lacks text contents.

When the solution according to the embodiments of the present application is applied, detection may be performed as follows:

In a first step, an intermediate result and a final result are acquired by tracing a web page jumping process using a distributed active crawler subsystem. For example, the acquired result may include the following code:

```
("<script language=\"javascript\">");
("document.write(\"<frameset rows=\'100%,*\' frameborder=\'NO\' border=\'0\' framespacing=\'0\'>\");");
("document.write(\"<frame id=\'80four\' name=\'80four\' src=\'/Robot/Fuck' scrolling=\'yes\'>\");");
("document.write(\"<\/frameset>\");");
("<\/script>")
```

As can be seen from the result, JavaScript contents in the third page include a string concatenation, and iframe jumping is implemented. Therefore, an active crawler according to the embodiments of the present application finds an iframe tag in the process of parsing the web page, and continues to load contents of the iframe.

In a second step, a predefined characteristic is extracted by using a characteristic extraction tool, and is inputted to a classification model (for example, a GBDT model) for classification.

In a third step, if the result outputted from the GBDT model is a suspicious malicious web address, the crawler first renders the web page into a picture, and then extracts a web page text content by using an image OCR technology.

In a fourth step, a topic judgment is made by using a semantic model based on the extracted web page text content.

In a fifth step, false alarm removal processing is performed on the result of the topic judgment.

Finally, a final classification result of determining that the above-mentioned suspicious web address is a malicious web address is outputted.

Figure 14:
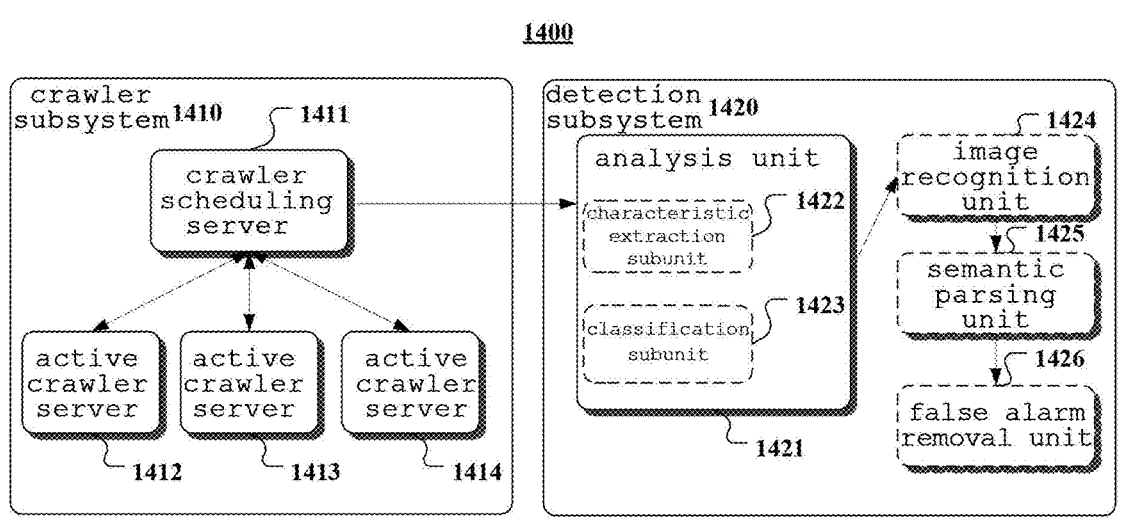
FIG. 14 is an exemplary structural block diagram of a system for detecting malicious web addresses according to an embodiment of the present application.

Further, referring to FIG. 14, FIG. 14 is an exemplary structural block diagram of a system for detecting malicious web addresses according to an embodiment of the present application.

As shown in FIG. 14, the 1400 system for detecting malicious web addresses may include a crawler subsystem 1410 and a detection subsystem 1420.

The crawler subsystem 1410 includes a crawler scheduling server 1411 and one or more active crawler servers 1412 to 1414. The crawler scheduling server 1411 is configured to receive a uniform resource locator (URL) reported by a user, and schedule the active crawler servers 1412 to 1414. The active crawler servers 1412 to 1414 are each configured to acquire, as scheduled by the crawler scheduling server 1411, an HTTP request chain associated with the URL reported by the user. The HTTP request chain is a sequential linked list including information about multiple HTTP request-response interactions during an access to the URL.

In some embodiments, the crawler scheduling server 1411 may be configured to schedule the active crawler servers in the following manner: determining a geographical location and network environment information of the user; and scheduling the URL reported by the user to an active crawler server whose geographical location and network environment information are closest to those of the user.

In some implementations, the crawler scheduling server 1411 may be configured to determine the geographical location and the network environment information of the user in the following manner: determining the geographical location and network operator information of the user based on an Internet Protocol (IP) address of the URL reported by the user; and determining the network environment information of the user based on the network operator information, wherein the network environment information includes at least a network bandwidth.

In some embodiments, the acquiring, by the active crawler servers 1412 to 1414, an HTTP request chain may include: downloading a web page content associated with the URL to obtain the HTTP request chain.

In some implementations, the active crawler servers 1412 to 1414 may be configured to grab a web page content after jumping and save an intermediate result by performing at least one of the following: rendering a Hypertext Markup Language Document Object Model (HTML DOM) tree by using a layout engine of a browser, to grab a web page content that jumps by using an inline frame (iframe) tag in an HTML document; executing JavaScript code by using a JavaScript engine, to grab a web page content that jumps by using the JavaScript code; and executing Flash by using a Flash player plugin, to grab a web page content that jumps using Flash.

The detection subsystem 1420 includes an analysis unit 1421, configured to analyze the HTTP request chain acquired by the crawler subsystem 1410 to determine whether the URL is a malicious web address.

In some embodiments, the analysis unit 1421 may include: a characteristic extraction subunit 1422, configured to extract a characteristic of at least one of the following dimensions from the HTTP request chain: upstream and downstream information, a server dimension, a web page programming language dimension, a time dimension, and web page description information; and a classification subunit 1423, configured to determine whether the URL is a normal web address or a suspicious malicious web address based on the extracted characteristic and by using a machine learning-based and built classification model.

Optionally or additionally, the detection subsystem 1420 may further include: an image recognition unit 1424, configured to: for the URL that is determined by the classification subunit 1423 as a suspicious malicious web address, extract a web page text content from the web page content that is associated with the URL and that is rendered into a picture, by using an optical character recognition (OCR) technology; and a semantic parsing unit 1425, configured to make a topic judgment on the web page text content by using a latent semantic model, to determine whether the URL is a malicious web address.

Optionally or additionally, the detection subsystem 1420 may further include: a false alarm removal unit 1426, configured to perform false alarm removal processing on the result of the topic judgment.

It should be appreciated that the subsystems or units recorded in the system 1400 correspond to the steps in the methods that are described with reference to FIG. 2 to FIG. 7. Therefore, the operations and features described above for the methods also apply to the system 1400 and the units included therein, and will not be repeatedly described here.

Figure 15:
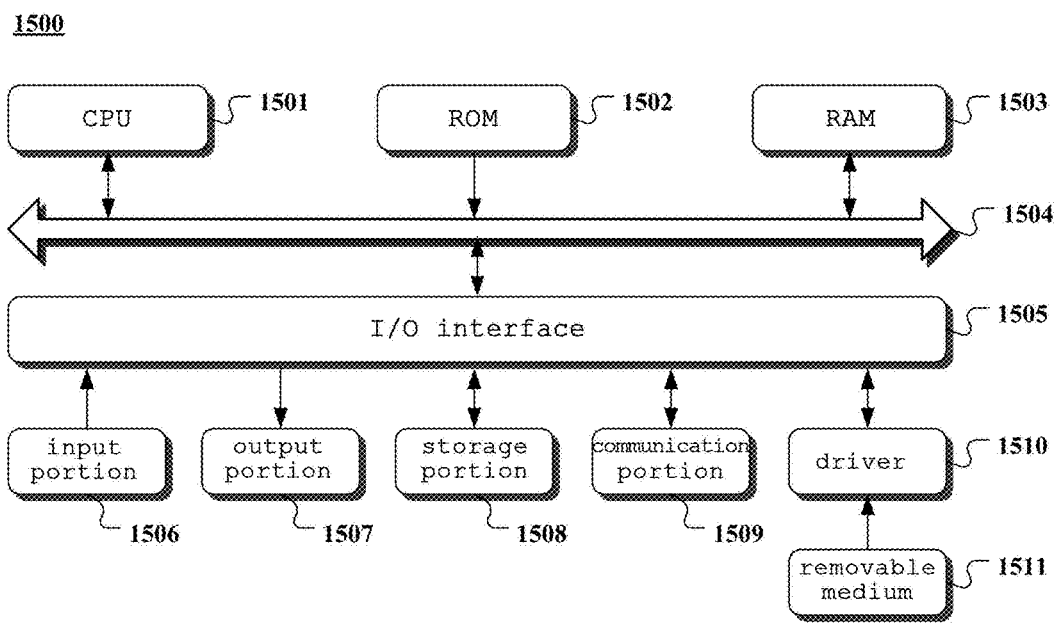
FIG. 15 is a schematic structural diagram of a computer system adapted to implement a server according to an embodiment of the present application.

Referring to FIG. 15, a schematic structural diagram of a computer system 1500 adapted to implement a server of the embodiments of the present application is shown.

As shown in FIG. 15, the computer system 1500 includes a central processing unit (CPU) 1501, which may execute various appropriate actions and processes in accordance with a program stored in a read-only memory (ROM) 1502 or a program loaded into a random access memory (RAM) 1503 from a storage portion 1508. The RAM 1503 also stores various programs and data required by operations of the system 1500. The CPU 1501, the ROM 1502 and the RAM 1503 are connected to each other through a bus 1504. An input/output (I/O) interface 1505 is also connected to the bus 1504.

The following components are connected to the I/O interface 1505: an input portion 1506 including a keyboard, a mouse etc.; an output portion 1507 comprising a cathode ray tube (CRT), a liquid crystal display device (LCD), a speaker etc.; a storage portion 1508 including a hard disk and the like; and a communication portion 1509 comprising a network interface card, such as a LAN card and a modem. The communication portion 1509 performs communication processes via a network, such as the Internet. A driver 1510 is also connected to the I/O interface 1505 as required. A removable medium 1511, such as a magnetic disk, an optical disk, a magneto-optical disk, and a semiconductor memory, may be installed on the driver 1510, to facilitate the retrieval of a computer program from the removable medium 1511, and the installation thereof on the storage portion 1508 as needed.

In particular, according to an embodiment of the present disclosure, the process described above with reference to FIGS. 2-7 may be implemented in a computer software program. For example, an embodiment of the present disclosure includes a computer program product, which comprises a computer program that is tangibly embedded in a machine-readable medium. The computer program comprises program codes for executing the method as illustrated in FIGS. 2-7. In such an embodiment, the computer program may be downloaded and installed from a network via the communication portion 1509, and/or may be installed from the removable media 1511.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a crawler unit and a detection unit, where the names of these units or modules are not considered as a limitation to the units or modules.

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The one or more programs are executed by one or more processors to implement the methods described in the present application.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for detecting a malicious web address, comprising:
    receiving a uniform resource locator (URL) reported by a terminal device of a user;
    acquiring a HyperText Transfer Protocol (HTTP) request chain associated with the URL, the HTTP request chain being a sequential linked list comprising information about multiple HTTP request-response interactions during an access to the URL; and
    analyzing the HTTP request chain to determine whether the URL is a malicious web address,
    wherein the acquiring an HTTP request chain comprises acquiring the HTTP request chain by using an active crawler server nearest to the user in a plurality of active crawler servers distributed in different geographical locations and configured to acquire the HTTP request chain associated with the URL, wherein a geographical location of the used active crawler server nearest to the user is a nearest geographical location to a geographical location of the terminal device of the user among the geographical locations of the plurality of active crawler servers,
    wherein the acquiring the HTTP request chain further comprises:
    determining a geographical location and network environment information of the user; wherein the determining the geographical location and network environment information of the user comprises:
    determining the geographical location and network operator information of the user based on an Internet Protocol (IP) address of the URL reported by the user; and
    determining the network environment information of the user based on the network operator information.

2. The method according to claim 1, wherein the acquiring the HTTP request chain comprises:
    determining the geographical location and network environment information of the user;
    scheduling the URL to an active crawler server having a network bandwidth closest to the user in the plurality of active crawler servers; and downloading from the active crawler server, a web page content associated with the URL to obtain the HTTP request chain.

3. The method according to claim 2, wherein the downloading a web page content associated with the URL to obtain the HTTP request chain comprises:
grabbing a web page content after jumping, and saving an intermediate result.

4. The method according to claim 3, wherein the grabbing a web page content after jumping comprises at least one of the following:
rendering a Hypertext Markup Language Document Object Model (HTML DOM) tree by using a layout engine of a browser, to grab a web page content that jumps using an inline frame (iframe) tag in an HTML document;
executing a JavaScript code by using a JavaScript engine, to grab a web page content that jumps using the JavaScript code; and
executing Flash by using a Flash player plugin, to grab a web page content that jumps using Flash.

5. The method according to claim 1, wherein the analyzing the HTTP request chain to determine whether the URL is a malicious web address comprises:
extracting a characteristic in one of following dimensions from the HTTP request chain: upstream and downstream information, a server dimension, a web page programming language dimension, a time dimension, and own descriptive information of a web page; and
determining whether the URL is a normal web address or a suspicious malicious web address based on the extracted characteristic and by using a machine learning-based and built classification model.

6. The method according to claim 5, wherein
the upstream and downstream information comprises at least one of following information: a number of 302 jumps, a percentage of 404 pages, whether a child URL comprises an advertising alliance link, whether a child URL comprises a malicious sub-link, and whether a child URL comprises a small website statistics tool;
the server dimension comprises at least one of following information: whether a server has a foreign Internet Protocol (IP) address, whether a server is Windows IIS, whether a content distribution network (CDN) technology is used, whether a server is a kangle server, whether a server is a netbox server, whether a server is a nginx server, whether a server is an apache server, and whether multimedia video is used;
the web page programming language dimension comprises at least one of following information: whether a web page is compiled using the Active Server Page (ASP) language, and whether a web page is compiled using the Hypertext Preprocessor (PHP) language;
the time dimension comprises at least one of following information: whether time is hot time, and whether time is weekend; and
the web page description information comprises at least one of following information: a web page size, time for loading a single URL, whether a website is on record, whether a web page is encrypted, and whether a web page has a free subdomain name.

7. The method according to claim 5, further comprising:
rendering a web page content associated with the URL into a picture and extracting a web page text content by using an optical character recognition (OCR) technology, in response to determining the URL being a suspicious malicious web address;
making a topic judgment on the web page text content by using a latent semantic model; and
determining whether the URL is a malicious web address based on the result of the topic judgment.

8. The method according to claim 7, further comprising:
performing false alarm removal processing on a result of the topic judgment.

9. The method according to claim 8, wherein the false alarm removal processing comprises at least one of:
determining, according to a white list, whether the determination of the URL as a malicious web address is a false alarm;
determining, by querying access information related to the URL, whether the determination of the URL as a malicious web address is a false alarm;
determining, by Internet content provider (ICP) filing information of the URL, whether the determination of the URL as a malicious web address is a false alarm; and
determining, by querying qualification data related to the URL, whether the determination of the URL as a malicious web address is a false alarm.

10. A system for detecting a malicious web address, comprising a crawler subsystem and a detection subsystem,
the crawler subsystem comprising a crawler scheduling server and a plurality of active crawler servers distributed in different geographical locations, the crawler scheduling server being configured to receive a uniform resource locator (URL) reported by a terminal device of a user, and schedule the one or more active crawler servers; and the active crawler servers being configured to acquire, as scheduled by the crawler scheduling server, a HyperText Transfer Protocol (HTTP) request chain associated with the URL, the HTTP request chain being a sequential linked list comprising information about multiple HTTP request-response interactions during an access to the URL; and
the detection subsystem comprises an analysis unit configured to analyze the HTTP request chain to determine whether the URL is a malicious web address,
wherein the crawler scheduling server is configured to schedule the reported URL to the active crawler server nearest to the user in the plurality of active crawler servers, wherein a geographical location of the active crawler server nearest to the user is a nearest geographical location to a geographical location of the terminal device of the user among the geographical locations of the plurality of active crawler servers,
wherein the acquiring the HTTP request chain further comprises:
determining a geographical location and network environment information of the user; wherein the determining the geographical location and network environment information of the user comprises:
determining the geographical location and network operator information of the user based on an Internet Protocol (IP) address of the URL reported by the user; and
determining the network environment information of the user based on the network operator information.

11. The system according to claim 10, wherein the acquiring, by the active crawler server, an HTTP request chain comprises:
downloading, by the active crawler server, a web page content associated with the URL to obtain the HTTP request chain.

12. The system according to claim 11, wherein the active crawler server is configured to grab a web page content after jumping and save an intermediate result by performing at least one of:
- rendering a Hypertext Markup Language Document Object Model (HTML DOM) tree by using a layout engine of a browser, to grab a web page content that jumps by using an inline frame (iframe) tag in an HTML document;
- executing a JavaScript code by using a JavaScript engine, to grab a web page content that jumps by using the JavaScript code; and
- executing Flash by using a Flash player plugin, to grab a web page content that jumps using Flash.

13. The system according to claim 10, wherein the analysis unit comprises:
- a characteristic extraction subunit, configured to extract a characteristic in one of following dimensions from the HTTP request chain: upstream and downstream information, a server dimension, a web page programming language dimension, a time dimension, and own descriptive information of a web page; and
- a classification subunit, configured to determine whether the URL is a normal web address or a suspicious malicious web address based on the extracted characteristic and by using a machine learning-based and built classification model.

14. The system according to claim 13, wherein
- the upstream and downstream information comprises at least one of following information: a number of 302 jumps, a percentage of 404 pages, whether a child URL comprises an advertising alliance link, whether a child URL comprises a malicious sub-link, and whether a child URL comprises a small website statistics tool;
- the server dimension comprises at least one of following information: whether a server has a foreign Internet Protocol (IP) address, whether a server is Windows IIS, whether a content distribution network (CDN) technology is used, whether a server is a kangle server, whether a server is a netbox server, whether a server is a nginx server, whether a server is an apache server, and whether multimedia video is used;
- the web page programming language dimension comprises at least one of following information: whether a web page is compiled using the Active Server Page ASP language, and whether a web page is compiled using the Hypertext Preprocessor (PHP) language;
- the time dimension comprises at least one of the following information: whether the time is a hot time, and whether the time is weekend; and
- the web page description information comprises at least one of the following information: a web page size, a time for loading a single URL, whether a website has been put on records, whether a web page has been encrypted, and whether a web page has a free subdomain name.

15. The system according to claim 13, wherein the detection subsystem further comprises:
- an image recognition unit, configured to: for the URL determined by the classification subunit as a suspicious malicious web address, extract a web page text content from the web page content associated with the URL and rendered into a picture, by using an optical character recognition (OCR) technology; and
- a semantic parsing unit, configured to make a topic judgment on the web page text content by using a latent semantic model, to determine whether the URL is a malicious web address.

16. The system according to claim 15, wherein the detection subsystem further comprises:
- a false alarm removal unit, configured to perform false alarm removal processing on a result of the topic judgment.

17. A device, comprising:
- one or more processors;
- a memory; and
- one or more programs stored in the memory, the one or more programs being used by the one or more processors to:
- receive a uniform resource locator (URL) reported by a terminal device of a user;
- acquire a HyperText Transfer Protocol (HTTP) request chain associated with the URL, wherein the HTTP request chain is a sequential linked list comprising information about multiple HTTP request-response interactions during an access to the URL; and
- analyze the HTTP request chain to determine whether the URL is a malicious web address,
- wherein the acquiring an HTTP request chain comprises acquiring the HTTP request chain by using an active crawler server nearest to the user in a plurality of active crawler servers distributed in different geographical locations and configured to acquire the HTTP request chain associated with the URL, wherein a geographical location of the used active crawler server nearest to the user is a nearest geographical location to a geographical location of the terminal device of the user among the geographical locations of the plurality of active crawler servers,
- wherein the acquiring the HTTP request chain further comprises:
- determining a geographical location and network environment information of the user; wherein the determining the geographical location and network environment information of the user comprises:
- determining the geographical location and network operator information of the user based on an Internet Protocol (IP) address of the URL reported by the user; and
- determining the network environment information of the user based on the network operator information.

18. A non-volatile computer readable storage medium, storing one or more programs, the one or more programs, when executed by a device, causing the device to:
- receive a uniform resource locator (URL) reported by a terminal device of a user;
- acquire a HyperText Transfer Protocol (HTTP) request chain associated with the URL, the HTTP request chain being a sequential linked list comprising information about multiple HTTP request-response interactions during an access to the URL; and
- analyze the HTTP request chain to determine whether the URL is a malicious web address,
- wherein the acquiring an HTTP request chain comprises acquiring the HTTP request chain by using an active crawler server nearest to the user in a plurality of active crawler servers distributed in different geographical locations and configured to acquire the HTTP request chain associated with the URL, wherein a geographical location of the used active crawler server nearest to the user is a nearest geographical location to a geographical location of the terminal device of the user among the geographical locations of the plurality of active crawler servers, wherein the acquiring the HTTP request chain further comprises:

determining a geographical location and network environment information of the user; wherein the determining the geographical location and network environment information of the user comprises:

determining the geographical location and network operator information of the user based on an Internet Protocol (IP) address of the URL reported by the user; and determining the network environment information of the user based on the network operator information.

* * * * *